(12) United States Patent
Justiniano et al.

(10) Patent No.: US 6,218,613 B1
(45) Date of Patent: Apr. 17, 2001

(54) DIVIDED STANDARD DEVICE INCH BOX

(75) Inventors: Joseph G. Justiniano, Centereach; Selin Tansi-Glickman, Great Neck; Stephen Stewart, Uniondale, all of NY (US); Danilo F. Estanislao, Old Bridge, NJ (US)

(73) Assignee: Leviton Manufacturing Co., Inc., Little Neck, NY (US)

( * ) Notice: Subject to any disclaimer, the term of this patent is extended or adjusted under 35 U.S.C. 154(b) by 0 days.

(21) Appl. No.: 09/136,579

(22) Filed: Aug. 19, 1998

(51) Int. Cl.$^7$ ........................................ H05K 5/02
(52) U.S. Cl. ................................. 174/50; 220/3.92
(58) Field of Search ...................... 174/50, 67; 220/3.8, 220/242, 3.92, 3.94, 4.02

(56) References Cited

U.S. PATENT DOCUMENTS

| | | | |
|---|---|---|---|
| 2,092,367 | * 9/1937 | Breitenstein | 220/3.94 |
| 2,506,212 | * 5/1950 | Grohsgal | 174/3.94 X |
| 3,113,694 | * 12/1963 | Sulzer | 174/50 X |
| 3,128,003 | * 4/1964 | Zagel | 220/3.92 X |
| 3,584,135 | * 6/1971 | Dowtin | 174/50 |
| 3,701,837 | * 10/1972 | Fork | 174/50 |
| 3,943,272 | * 3/1976 | Carroll et al. | 174/50 X |
| 4,323,723 | * 4/1982 | Fork et al. | 220/3.94 X |
| 4,433,204 | * 2/1984 | Wuertz | 220/3.94 X |
| 4,660,912 | * 4/1987 | Tomek | 174/67 X |

* cited by examiner

Primary Examiner—Dean A. Reichard
(74) Attorney, Agent, or Firm—Paul J. Sutton

(57) ABSTRACT

To separate the chamber of a standard device box into two compartments, one for high voltage power conductors and the other for low power signal conductors a deflectable isolation barrier is employed. In a first form the barrier, its supporting means and attaching means are formed as an integral unit and fastened to the inside surface of a wall plate. The barrier takes a position in the box based upon the depth of the box. In a second form the deflectable isolation barrier is formed as an extension of the side wall of a box insert to be placed in the device box.

13 Claims, 4 Drawing Sheets

DIVIDED STANDARD DEVICE INCH BOX

BACKGROUND OF THE INVENTION

1. Field of the Invention

The invention is directed to wiring devices and more particularly to standard device boxes where there are present low voltage communications conductors and higher voltage power conductors.

2. Description of the Prior Art

To permit the separation of power and communications conductors prior art devices employ specially shaped housings and separators. Once installed these devices can only be used with fittings configured to work with such housings. There is no available separator device which can be added to a standard device box, at the time of installation or retrofitted into existing boxes to provide separate compartments for the communication and power conductors.

SUMMARY OF THE INVENTION

The instant invention overcomes the shortcomings of the prior art by providing a deflectable isolation barrier which can be installed into a standard device box to divide the available wiring space into two separate compartments, one for communications conductors and the other for power conductors. In a first embodiment, the deflectable isolation barrier is coupled to the wall plate used to close the open front face of the device box and extends into the box chamber at an angle. The angle being determined by the line of engagement of the free end of the barrier with the floor of the base member of the box. The barrier extends between the front and rear walls and to a side wall and the base member to form a compartment which can only be entered through a knock-out in the box walls or base member. The second compartment is defined by the front and rear walls, the other side wall, the base member and the barrier and can only be entered via a knock-out.

In a second embodiment, the deflectable isolation barrier is formed as a part of an insert which can be placed within a device box. The operation of the barrier of this embodiment is essentially the same as that of the first embodiment.

It is an object of this invention to provide a novel means for dividing the chamber of a standard device box into two compartments.

It is an object of this invention to provide a novel means for dividing the chamber of a standard device box at the time of installation of such box or thereafter.

It is another object of this invention to provide a novel deflectable isolation barrier which is coupled to a wall plate used to seal the open top face of a box.

It is still another object of this invention to provide a novel deflectable isolation barrier formed as part of an insert placed in and mounted to a box.

Other objects and features of the invention will be pointed out in the following description and claims and illustrated in the accompanying drawings, which disclose, by way of example, the principles of the invention and the best modes which are presently contemplated for carrying them out.

BRIEF DESCRIPTION OF THE DRAWINGS

In the drawings in which similar elements are given similar reference characters.

DESCRIPTION OF THE PREFERRED EMBODIMENTS

The National Electrical Code (N.E.C.) has strict requirements for separation of line voltage power conductors (120V, 220V) from signal current conductors (24 Volt or less, telephone and computer lines). The signal lines must be physically separated from higher voltage power conductors to prevent accidental contact between them when installing or servicing the power line or signal conductors. The separation of high and low voltage conductors within the same box is intended for use with such things as line voltage electronic devices that require low voltage input signals to them for control purposes.

The line voltage electronic devices and control devices are often installed in a standard device box or so-called "4 inch box" which actually measures $4^{11}/_{16} \times 4^{11}/_{16}$. These boxes have provision to be mounted to a stud, rafter or other suitable support and mounting ears to which various devices can be attached and then covered by a wall plate. The boxes have a base member or wall and four side walls fixed to the base member to form a box open at the top surface and closed by means of a wall plate and are commonly used for two side by side devices or a device and its wiring. Knock-outs located in the box walls and base member permit power and signal conductors to enter and exit the box.

Figure 4:
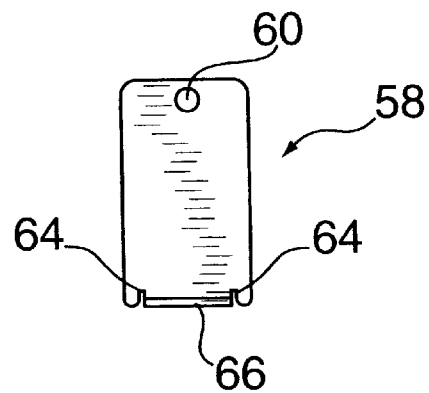
FIG. 4 is a top plan view of the access door of the wall plate of FIG. 1.
Figure 5:
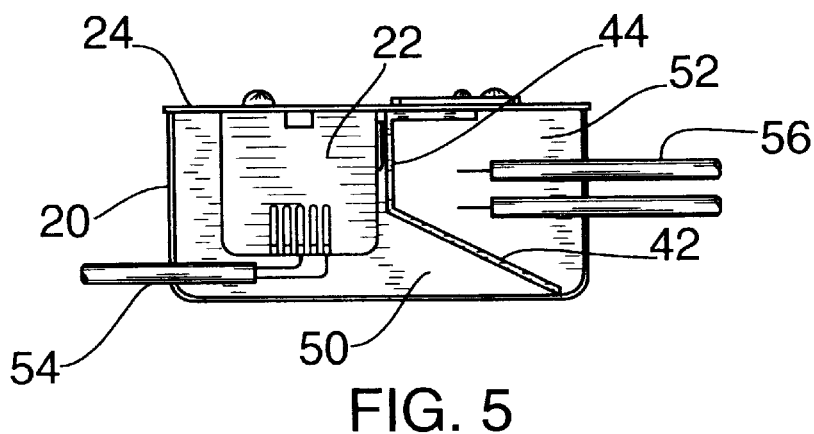
FIG. 5 shows the device illustrated in FIG. 2 with conductors placed in the two shown compartments.
Figures 6, 7:
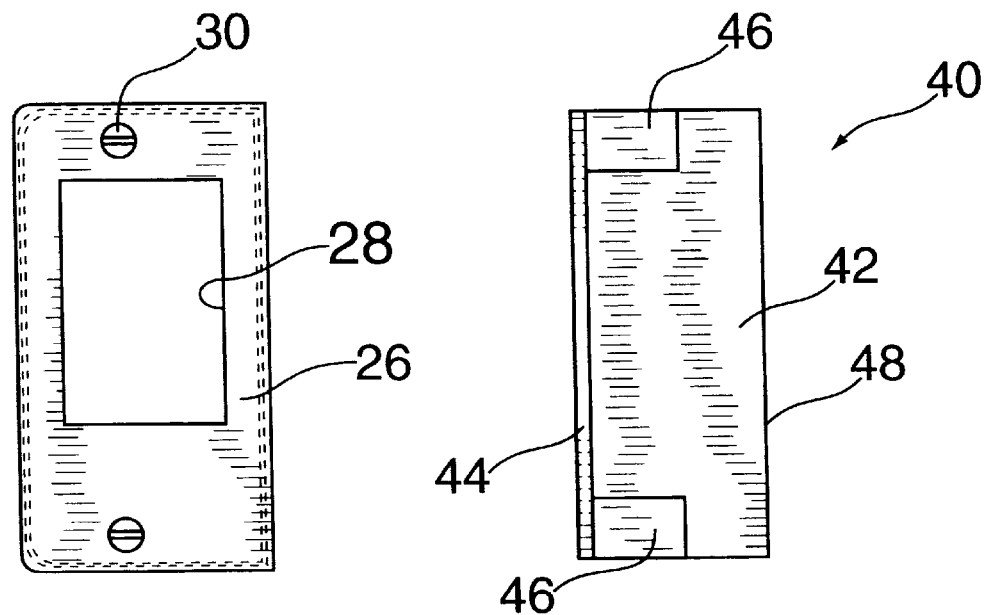
FIG. 6 is a top plan view of a modified wall plate of FIG. 1.
FIG. 7 is a top plan view of the deflectable isolation barrier of FIGS. 2 and 3.
Figure 8:
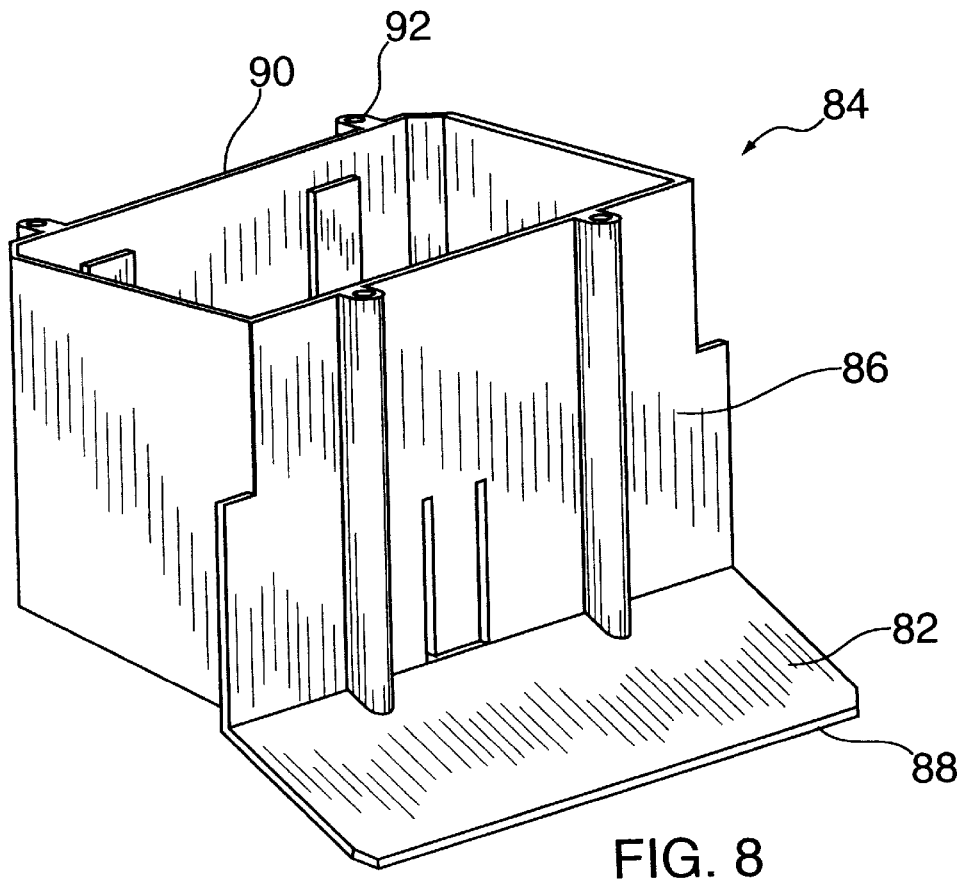
FIG. 8 is front perspective view of a further embodiment of a deflectable isolation barrier constructed in accordance with the concepts of the invention.
Figure 9:
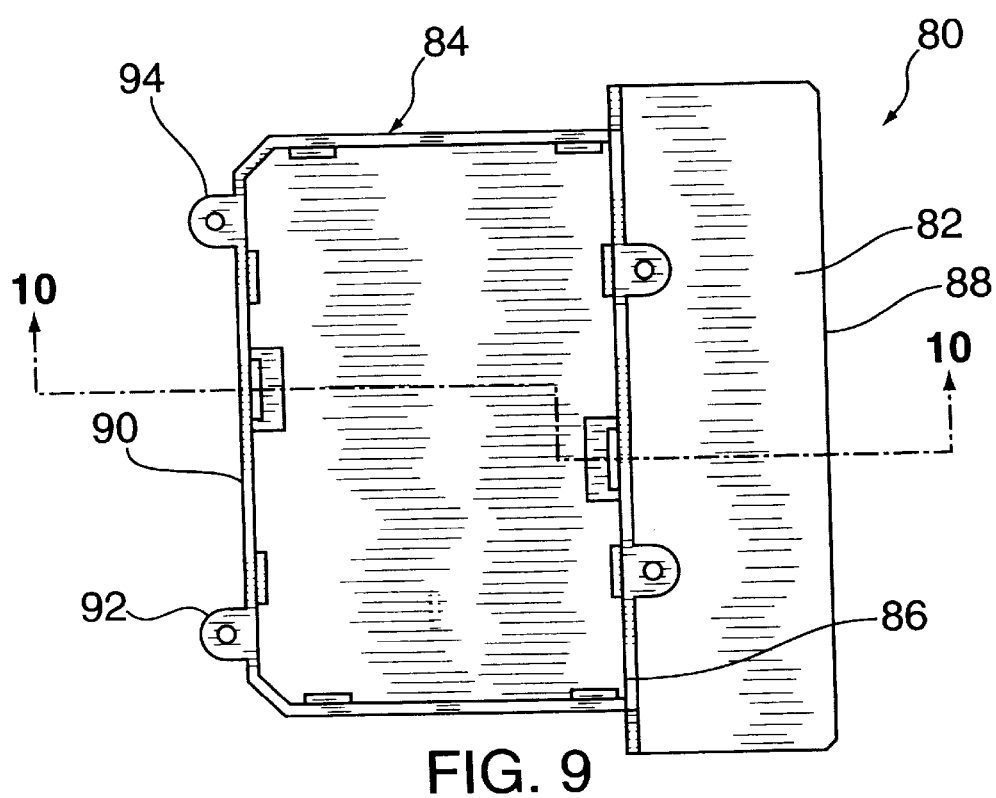
FIG. 9 is a top plan view of the device of FIG. 8.
Figure 10:
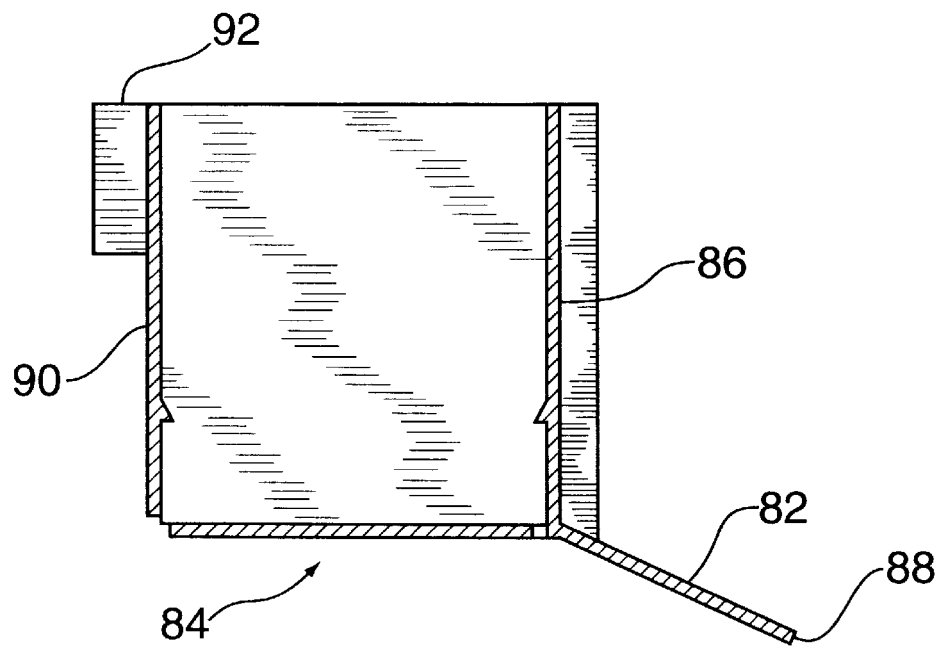
FIG. 10 is a front elevational view, partly in section, of the device of FIG. 9, taken along the lines 10—10.

Turning now to FIGS. 1 to 7 there is shown a 4 inch box or a standard device box 20 which has mounted therein a line voltage electronic device 22 mounted to a wall plate 24. The electronic device 22 or other device, such as a receptacle, could also project through and beyond the wall plate 26. In such case an aperture 28 in wall plate 26, as shown in FIG. 6 would be used. The aperture will be configured to the portion of the device projecting from the box 20. The wall plate 24 is mounted to the mounting ears (not shown) of box 20 by four mounting screws 30.

A first embodiment of interior chamber divider 40 is shown in FIGS. 2, 3, 5 and 7. A deflectable isolation barrier 42 is mounted to a vertical support means 44 which in turn is connected to tabs 46 adjacent the ends of the vertical support means 44. These tabs 46 may be glued, soldered, welded, brazed, bonded or the like to the inside surface of wall plate 24 . The barrier 42 and the support means 44 extend for the entire distance between a front wall and its parallel, spaced apart rear wall so as to divide the standard device box 20 chamber into two compartments 50 and 52.

Compartment 50 receives the electronic device 22 and the high voltage power conductors 54 through a suitable knock-out (see FIG. 5) while compartment 52 receives the low power signal conductors 56 through a suitable knock-out. To permit access to compartment 52 from the front of box 20 a small access door 58 is provided in the wall plate 24 adjacent compartment 52. Access door 58, as shown in FIG. 4 is generally rectangular and has a mounting hole 60 at its top end to be fastened by a screw 62 to the wall plate 24. The bottom end of access door 58 is notched at 64 and an L-shaped lip 66 is created to engage the rear surface of the wall plate 24 when the access door 58 is in place. To position the access door 58, the lip is made to engage the rear surface of wall plate 24 and the top end is rotated to align hole 60 with a corresponding aperture in the wall plate 24 (not shown) at which time screw 62 is employed to assemble the access door 58 to wall plate 24.

Figure 1:
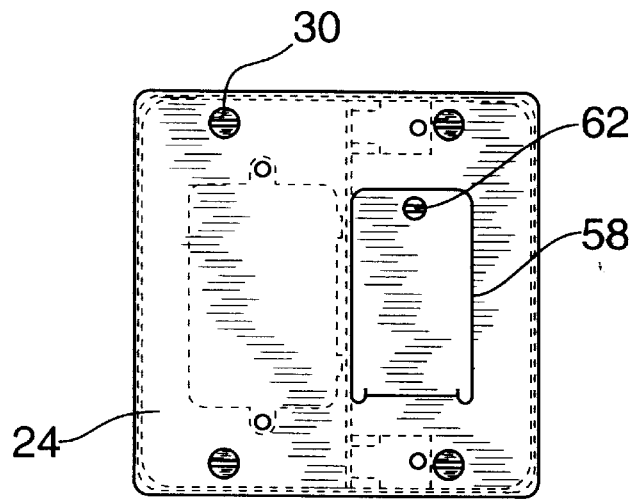
FIG. 1 is a top plan view of a wall plate installed over the open top surface of a standard device box.
Figure 2:
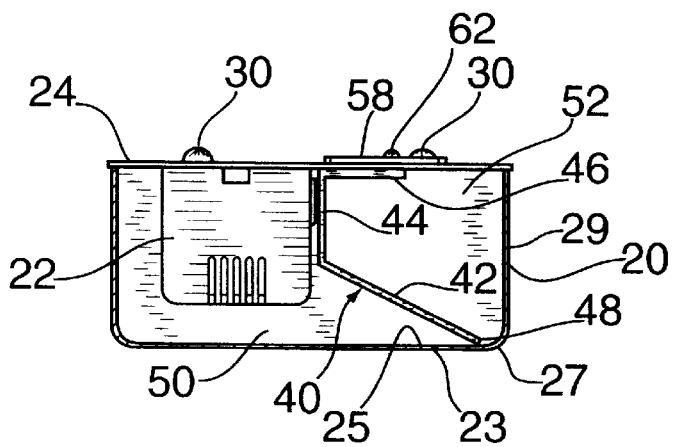
FIG. 2 is a front elevational view, partly in section, of a deflectable isolation barrier according to the instant invention.
Figure 3:
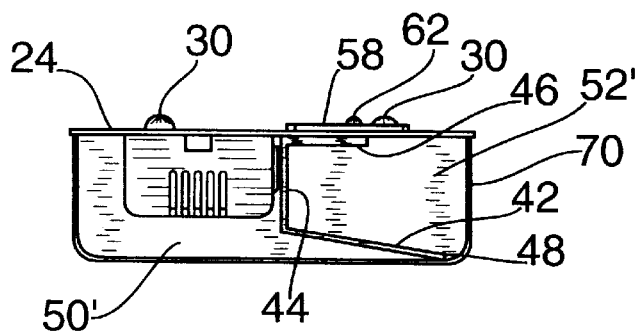
FIG. 3 is a front elevational view, partly in section, of the deflectable isolation barrier of FIG. 2 installed in a box shallower than that of FIG. 2.

The deflectability of the deflectable isolation barrier 42 is a definite advantage when used with standard device boxes of different depths. The box 20 of FIGS. 2 and 5 is 2⅛ inches deep and the barrier 42 takes on a steep slope while the free end 48 engages the inner surface 25 of base member 23 close to the curved edge 27 between the base member 23 and side 29. When the interior chamber divider 40 is placed in a box 70 having a depth of 1½ inches, the barrier 42 takes on a less steep slope and the free end 48 takes a similar position. Conductors are introduced into the compartments 50', 52' through knock-outs.

The interior chamber divider 40 may be made as a single unit and molded of a thermoplastic or thermosetting plastic, natural or synthetic rubber or the like.

Figure 11:
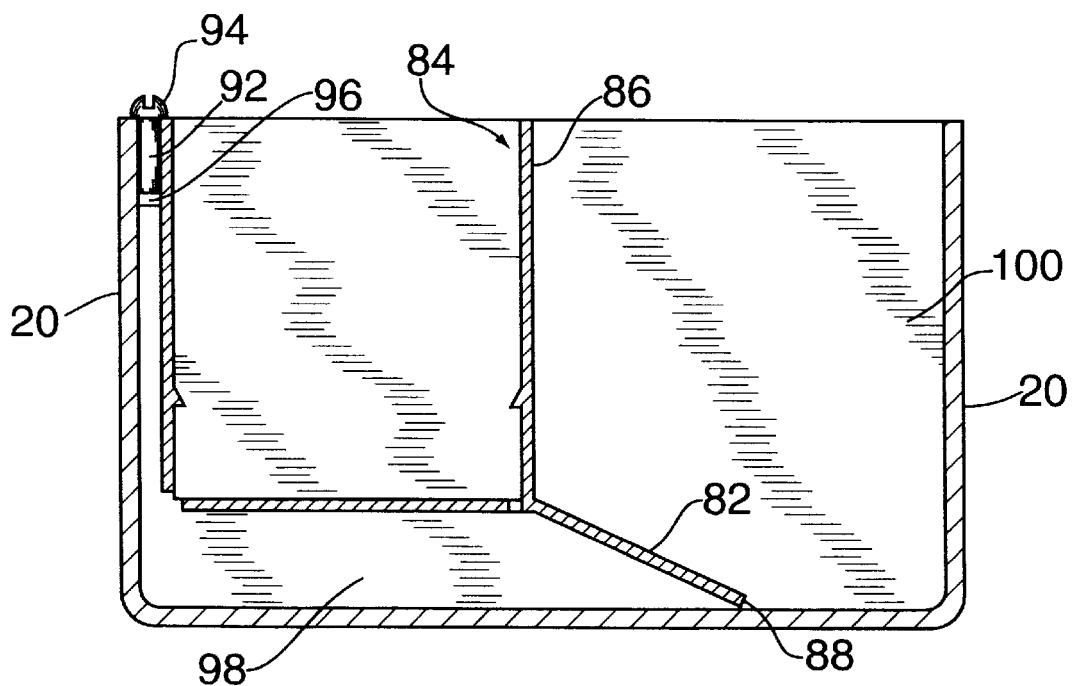
FIG. 11 is a front elevational view, partly in section of the device of FIG. 10, installed in and to a standard device box.

It is also possible to form an interior chamber divider 80 with a deflectable isolation barrier 82 coupled to one wall of a box insert 84 whose wall 86 provides the support means for barrier 82. Barrier 82 ends in a free end 88. The insert 84 has a wall 90 parallel with and spaced apart from side wall 86. Two short mounting collars 92 permit box insert 84 to be mounted to the box 20 by means of fasteners 94 which extend through the mounting collars 92 and into mounting ears 96 on the inside of box 20 (see FIG. 11). The deflectable isolation barrier 82 takes a position determined largely by the extent to which box insert 84 extends into box 20. As shown the free end 88 of barrier 82 engages the interior surface 25 of base member 23 and creates two compartments 98 and 100.

While there have been shown and described and pointed out the fundamental novel features of the invention as applied to the preferred embodiment, as are presently contemplated for carrying them out, it will be understood that various omissions and substitutions and changes of the form and details of the devices illustrated and in their operation may be made by those skilled in the art, without departing from the spirit of the invention.

We claim:

1. Apparatus for dividing an interior chamber of an industry-standard 4$\frac{11}{16}$×4$\frac{11}{16}$ inch box capable of housing an electrical device or the like and having a base member, integral first and second parallel, spaced apart walls, and integral third and fourth parallel, spaced apart side walls, said base member and said four integral wall forming a box open at its top surface and said first wall being formed with at least two apertures, said apparatus comprising:

a) a deflectable isolation barrier disposed within said box so as to divide an interior chamber defined by said box into two compartment and having a first end, a free second end, a first width, a first surface and a second surface; and b) support means coupled to said first end of said deflectable isolation barrier to position said free second end adjacent an interior surface of said base member, to form a first compartment between said first surface and interior surfaces of said first and second walls, an adjacent side wall and said base member, and a second compartment between said second surface and interior surfaces of said first and second walls, an adjacent side wall and said base member, said support means beings bonded to said wall plate.

2. An apparatus, as defined in claim 1, wherein said first width, is equal to a separation between the interior surfaces of said first and second walls.

3. An apparatus, as defined in claim 1, further comprising:

a) a wall plate closing the open top surface; and b) said support means coupled to an interior surface of said wall plate.

4. An apparatus, as defined in claim 3, further comprising:

a) an access door in said wall plate to permit access to wires which may be disposed in one of said two compartments.

5. An apparatus, as defined in claim 3, wherein said support means is welded to said wall plate.

6. An apparatus, as defined in claim 3, wherein said support means is attached to said wall plate with glue.

7. An apparatus, as defined in claim 3, wherein said support means is brazed to said wall plate.

8. An apparatus, as defined in claim 3, wherein said support means has two arms fastened to said wall plate.

9. An apparatus, as defined in claim 1, further comprising:

a) an insert placed in and coupled to said box; and b) said deflectable isolation barrier extending from said insert into said chamber of said box.

10. An apparatus, as defined in claim 9, wherein said insert is a five sided box open at a top surface and composed of a front wall positioned adjacent said box first wall, a rear wall positioned adjacent said box second wall, a base member positioned adjacent said box base member, a first insert side wall positioned adjacent one of said side walls of said box and a second insert side wall positioned intermediate space between interiors of said two side walls.

11. An apparatus as defined in claim 9, further comprising means for coupling said insert to said box.

12. An apparatus, as defined in claim 10, wherein said deflectable isolation barrier is coupled to a joint between said base member of said insert and one of said side walls of said insert.

13. An apparatus, as defined in claim 1, wherein the position of said deflectable isolation barrier is determined by a line of contact between said free second end of said deflectable isolation barrier and an interior surface of said box base member.

* * * * *